(12) United States Patent
Kikuchi et al.

(10) Patent No.: US 8,709,569 B2
(45) Date of Patent: Apr. 29, 2014

(54) OPTICAL RECORDING MEDIUM, AND METHOD FOR PRODUCING OPTICAL RECORDING MEDIUM

(75) Inventors: Minoru Kikuchi, Miyagi (JP); Hiroyuki Kawasaki, Miyagi (JP); Takashi Ohgi, Miyagi (JP); Yoshiaki Nakata, Tochigi (JP)

(73) Assignees: Sony Corporation, Tokyo (JP); Dexerials Corporation, Tokyo (JP)

( * ) Notice: Subject to any disclaimer, the term of this patent is extended or adjusted under 35 U.S.C. 154(b) by 778 days.

(21) Appl. No.: 12/878,531

(22) Filed: Sep. 9, 2010

(65) Prior Publication Data

US 2011/0059285 A1 Mar. 10, 2011

(30) Foreign Application Priority Data

Sep. 9, 2009 (JP) ................. P2009-208157

(51) Int. Cl.
  *G11B 7/24* (2013.01)
(52) U.S. Cl.
  USPC ............... 428/64.1; 428/64.4; 430/270.11

(58) Field of Classification Search
  USPC ...................... 428/64.4; 430/270.11
  See application file for complete search history.

(56) References Cited

U.S. PATENT DOCUMENTS

2009/0324870 A1* 12/2009 Ito et al. .............. 428/65.1

FOREIGN PATENT DOCUMENTS

| JP | 2005-272693 | 10/2005 |
| JP | 2008-071439 | 3/2008 |
| JP | 2009-009638 | 1/2009 |

OTHER PUBLICATIONS

Japanese Office Action issued in connection with Japanese Patent Application No. 2009-208157, dated Jan. 22, 2013. (3 pages).

* cited by examiner

*Primary Examiner* — Elizabeth Mulvaney
(74) *Attorney, Agent, or Firm* — K&L Gates LLP (57) ABSTRACT

An optical recording medium includes: a substrate; an information recording layer formed on the substrate for recording and reproducing an information signal by irradiation with light; and a light transmission layer formed on the information recording layer and transmitting the light, the storage elastic modulus of the light transmission layer at $-5°$ C. being within a range of 1500 MPa or less.

8 Claims, 6 Drawing Sheets

Gin  Gon

OPTICAL RECORDING MEDIUM, AND METHOD FOR PRODUCING OPTICAL RECORDING MEDIUM

CROSS REFERENCES TO RELATED APPLICATIONS

The present application claims priority to Japanese Priority Patent Application JP 2009-208157 filed in the Japan Patent Office on Sep. 9, 2009, the entire contents of which is hereby incorporated by reference.

BACKGROUND

The present application relates to an optical recording medium. Specifically, it relates to an optical recording medium having a light transmission layer made of a UV-curable resin and also to a method for producing the optical recording medium.

Optical recording media with increased density have been developed, and high-density optical discs having remarkably larger capacity than usual CDs (Compact Discs) and DVDs (Digital Versatile Discs), for example, are known.

In a high-density optical disc, an information signal portion for recording and/or reproducing an information signal is formed on one principal surface of the disc substrate, and a reflection film is formed on the information signal portion. Further, a light transmission layer and a protective layer are formed thereon by spin coating, for example. At the time of recording/reproduction, a laser beam is applied through the light transmission layer to the information signal portion, whereby recording or reproduction is performed.

Such a high-density optical disc has the light transmission layer, which is made of a resin curable by an activation energy beam, only on one side thereof (information-output side where a laser beam enters), and thus is asymmetric in the disc thickness direction. Due to this structure, as compared with DVDs and the like, high-density optical discs are more prone to warping.

In order to solve the problem of warping of high-density optical discs, various techniques have been proposed. For example, JP-A-2009-009638 (Patent Document 1) proposes an optical recording medium including a light transmission layer with the difference in tensile elastic modulus between −20° C. and 25° C. being 1400 MPa or less.

SUMMARY

In the optical recording medium defined in claim 1 of Patent Document 1, the difference in the tensile elastic modulus of the light transmission layer between −20° C. and 25° C. is 1400 MPa or less. However, such an optical recording medium of claim 1 of Patent Document 1 does not achieve sufficient suppression of warping at a low temperature of about −5° C.

Further, in the optical recording medium of claim 2 of Patent Document 1, the tensile elastic modulus of the light transmission layer at 25° C. is 100 MPa or more and 800 MPa or less. However, such an optical recording medium defined in claim 2 of Patent Document 1 does not achieve sufficient suppression of warping at a low temperature of about −5° C.

Thus, it is desirable to provide an optical recording medium that resists warping at low temperatures and a method for producing such an optical recording medium.

According to an embodiment, there is provided an optical recording medium including a substrate, an information recording layer formed on the substrate for recording and reproducing an information signal by irradiation with light, and a light transmission layer transmitting light. The storage elastic modulus of the light transmission layer at −5° C. is within a range of 1500 MPa or less.

According to another embodiment, there is provided a method for producing an optical recording medium, including the steps of: forming an information recording layer on a substrate for recording and reproducing an information signal by irradiation with light; and applying a UV-curable resin composition onto the information recording layer and then curing the UV-curable resin composition to form a light transmission layer on the information recording layer. The storage elastic modulus of the light transmission layer at −5° C. is within a range of 1500 MPa or less.

According to these embodiments, the storage elastic modulus of the light transmission layer at −5° C. is within a range of 1500 MPa or less. This allows suppression of warping of the optical recording medium at a low temperature of about −5° C., for example.

These embodiments make it possible to suppress warping of optical recording media at low temperatures.

Additional features and advantages are described herein, and will be apparent from the following Detailed Description and the figures.

DETAILED DESCRIPTION

The present application with be described below with reference to the drawings according to an embodiment.

1. First Embodiment (first example of an optical recording medium)
2. Second Embodiment (second example of an optical recording medium)
3. Third Embodiment (third example of an optical recording medium)
4. Fourth Embodiment (fourth example of an optical recording medium)
5. Other Embodiments (variations)

1. First Embodiment

Configuration of Optical Recording Medium

Figure 1:
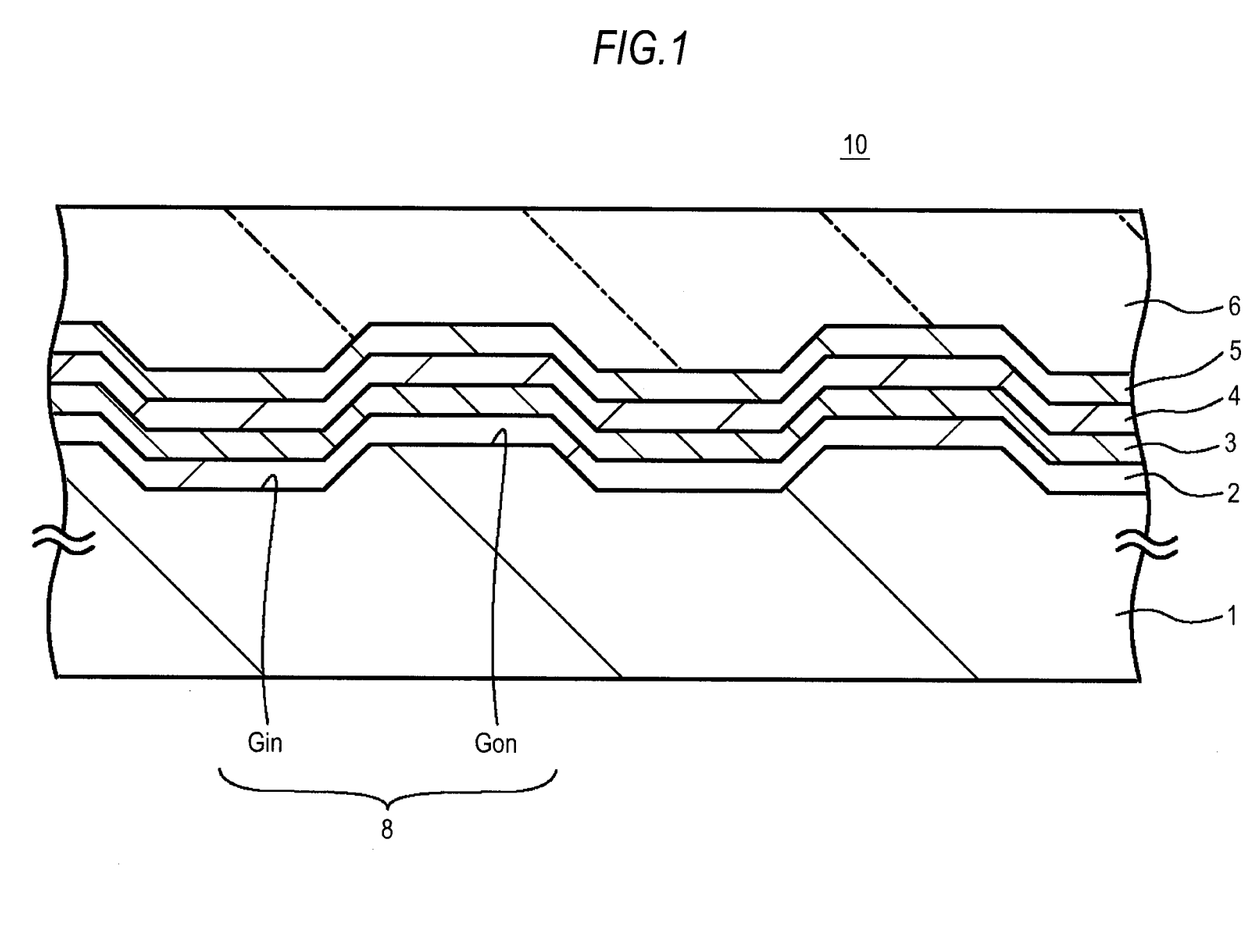
FIG. 1 is a cross section showing a configuration example of an optical recording medium according to a first embodiment.

The following will describe a recordable optical recording medium according to a first embodiment. FIG. 1 is a cross section schematically showing a configuration example of a recordable optical recording medium according to the first embodiment. The recordable optical recording medium 10 is configured to include a reflective layer 2, a first protective layer 3, an information recording layer 4, a second protective layer 5, and a light transmission layer 6 sequentially stacked on a substrate 1.

In the recordable optical recording medium 10, the information recording layer 4 is irradiated with a laser beam from the light-transmission-layer-6 side to record or reproduce an information signal. For example, a laser beam having a wavelength within a range of 400 nm or more and 410 nm or less is concentrated by an objective lens with a numerical aperture within a range of 0.84 or more and 0.86 or less, and is applied to the information recording layer 4 from the light-transmission-layer-6 side, whereby the information recording layer 4 records or reproduces an information signal. An example of such a recordable optical recording medium 10 is BD-R (Blu-ray Disc Recordable).

The following describes, in turn, the substrate 1, the reflective layer 2, the first protective layer 3, the information recording layer 4, the second protective layer 5, and the light transmission layer 6 forming the recordable optical recording medium 10.

Substrate

The substrate 1 has a circular shape with an opening formed in its center (hereinafter referred to as a center hole), for example. One principal surface of the substrate 1 is an uneven surface 8, for example, on which the information recording layer 4 is to be formed. The protrusions and depressions in the uneven surface 8 are hereinafter referred to as in-grooves Gin and on-grooves Gon, respectively.

The in-grooves Gin and on-grooves Gon are formed spirally or concentrically, for example. Further, the in-grooves Gin and/or the on-grooves Gon are wobbled (meandering) for the addition of address information, for example.

The diameter of the substrate 1 is 120 mm, for example. The thickness of the substrate 1 is determined in consideration of rigidity, and is preferably 0.3 mm to 1.3 mm, and more preferably 0.6 mm to 1.3 mm. The thickness is, for example, 1.1 mm. The diameter of the center hole is 15 mm, for example.

The material for the substrate 1 may be a plastic material or glass, for example. Plastic materials are preferable in terms of cost. Examples of usable plastic materials include polycarbonate-based resin, polyolefin-based resin, and acrylic resin.

Reflective Layer

As the material for the reflective layer 2, any of the metals, semi-metals, and so forth generally usable for known optical discs, such as an Ag alloy and an Al alloy, may be suitably selected according to the properties desired for the reflective layer 2. Further, as the material for the reflective layer 2, one having heat sink (heat dissipation) capability as well as light reflectivity is preferably used. This allows the reflective layer 2 to function also as a heat dissipation layer.

First Protective Layer and Second Protective Layer

The first protective layer 3 and the second protective layer 5 serve to protect the information recording layer 4 and control the optical properties and thermal properties at the time of recording/reproduction. The materials for the first protective layer 3 and the second protective layer 5 may be dielectrics generally usable for known optical discs, such as SiN, ZnS—SiO$_2$, and Ta$_2$O$_5$.

It is possible that at least either the first protective layer 3 or the second protective layer 5 contains indium tin oxide (hereinafter referred to as ITO) as a main component. This configuration allows simultaneous achievement of storage reliability and high productivity. It is particularly preferable that both the first protective layer 3 and the second protective layer 5 contain ITO as a main component, because this further improves storage reliability.

In order to obtain appropriate reflectance, the thickness of the first protective layer 3 is preferably 10 nm to 40 nm, and more preferably 20 nm to 30 nm. In order to increase the recording power margin, the thickness of the second protective layer 5 is preferably 11 nm to 34 nm, and more preferably 16 nm to 30 nm.

Information Recording Layer

The information recording layer 4 is a recordable information recording layer. The information recording layer 4 contains, for example, ZnS, SiO2, and Sb, as a main component and optionally further includes at least one element selected from the group consisting of Zn, Ga, Te, V, Si, Ta, Ge, In, Cr, Sn, and Tb. The information recording layer 4 preferably has a composition represented by the following formula (1).

$$[(ZnS)x(SiO2)1-x]y(SbzX1-z)1-y \qquad (1)$$

wherein $0<x\leq1.0$, $0.3\leq y\leq0.7$, $0.8<z\leq1.0$, and X is at least one element selected from the group consisting of Ga, Te, V, Si, Zn, Ta, Ge, In, Cr, Sn, and Tb.

In order to obtain excellent recording/reproduction characteristics, the thickness of the information recording layer 4 is preferably 3 nm to 40 nm.

In the information recording layer 4 containing ZnS, SiO2, and Sb as main components, such ZnS, SiO2, and Sb are in an amorphous state prior to recording. When the information recording layer 4 in such a state is irradiated with a laser beam, Sb crystals are formed in the central portion of the information recording layer 4, and other atoms gather in the vicinity of the interface. As a result, the optical constant (n: refractive index, k: damping coefficient) changes, whereby an information signal is recorded. Such an information recording layer 4 having Sb crystals in its central portion is difficult to return to the pre-recording amorphous state. The information recording layer is thus used as a recordable information recording layer.

Thus, when the information recording layer 4 contains ZnS, SiO2, and Sb as main components and preferably further has the composition represented by the above formula (1), the recorded information in its initial state is stably stored for a long period of time. Further, at the time of signal reproduction, loss of the signal due to the reproduction laser beam is suppressed, and during the ordinary long-term storage, the writing characteristics are maintained with less deterioration. In addition, relative to the recording and/or reproduction laser beam, sufficient sensibility and reaction rate can be achieved. As a result, excellent recording/reproduction characteristics can be obtained over wide ranges of linear velocity and recording power.

Materials usable for the information recording layer 4 are not limited to those mentioned above, and it is also possible to use an inorganic recording material generally usable for known recordable optical recording media.

For example, the information recording layer 4 may be a phase-change information recording layer containing Te, Pd, and O (oxygen) as main components. The information recording layer has, for example, a composition represented by the following formula (2).

$$(TexPd1-x)yO1-y \qquad (2)$$

wherein $0.7\leq x\leq0.9$, and $0.3\leq y\leq0.7$.

The information recording layer 4 may also be an alloy-type information recording layer including a stack of a silicon (Si) film and a copper (Cu) alloy film or alternatively an information recording layer containing Ge, Bi, and N as main components.

Light Transmission Layer

The light transmission layer 6 is formed by curing a UV-curable resin composition. The storage elastic modulus of the light transmission layer 6 at −5° C. is within a range of 1500 MPa or less, and more preferably within a range of 20 MPa or more and 1500 MPa or less. As a result, warping of the recordable optical recording medium 10 at a low temperature of about −5° C., for example, can be significantly reduced.

UV-Curable Resin Composition

The UV-curable resin composition at least includes an oligomer component and a photopolymerization initiator component. The UV-curable resin composition may further include at least either a bi- or higher functional monomer component or a monofunctional monomer component.

For example, the UV-curable resin composition includes: an oligomer component having a viscosity at 25° C. of 300 mPa·s to 3000 mPa·s in the form of an uncured liquid and also having a glass transition temperature of −50° C. to 15° C. in the form of a simple, cured substance; and a photopolymerization initiator component. The UV-curable resin composition may further include at least either a bi- or higher functional monomer component or a monofunctional monomer component each having a glass transition temperature of −40° C. to 90° C. in the form of a simple, cured substance.

After curing, the storage elastic modulus of the UV-curable resin composition at −5° C. is within a range of 1500 MPa or less, and more preferably within a range of 20 MPa or more 1500 MPa or less. In addition, the glass transition temperature of the UV-curable resin composition as cured is −20° C. or more and 20° C. or less.

Oligomer Component

As the oligomer component, a (meth)acrylate oligomer can be used, for example. A (meth)acrylate herein means an acrylate or a methacrylate. Examples of (meth)acrylate oligomers are urethane (meth)acrylate, epoxy (meth)acrylate, and the like having a glass transition temperature of −50° C. to 15° C. in the form of a simple, cured substance. Examples of commercially available urethane (meth)acrylate are UV-6100B (manufactured by NIPPON GOHSEI), EB230 and EB8405 (manufactured by DAICEL-CYTEC), and CN9004 (manufactured by SARTOMER JAPAN). An example of commercially available epoxy (meth)acrylate is EB3500 (manufactured by DAICEL-CYTEC). A (meth)acrylate oligomer has two to four (meth)acryloyl groups in the molecule (repeating unit), for example. A (meth)acryloyl group herein means an acryloyl group or a methacryloyl group. The number-average molecular weight of a (meth)acrylate oligomer is preferably 500 to 10000. One kind of (meth)acrylate oligomer may be used, or alternatively, two or more kinds of (meth)acrylate oligomers may used in combination.

Photopolymerization Initiator Component

A preferred example of the photopolymerization initiator component is such a photopolymerization initiator that the long-wavelength absorption edge λ of the UV-visible absorption spectrum of a 0.01% acetonitrile solution is less than 405 nm. Examples of such photopolymerization initiators include 1-hydroxy-cyclohexyl-phenyl ketone, 2-hydroxy-2-methyl-1-phenyl-propan-1-one, and 2-methyl-1[4-methylthio]phenyl-2-morpholinopropan-1-one. An example of commercially available 1-hydroxy-cyclohexyl-phenyl-ketone is IRGACURE 184 (manufactured by CIBA JAPAN). An example of commercially available 2-hydroxy-2-methyl-1-phenyl-propan-1-one is DAROCUR 1173 (manufactured by CIBA JAPAN)). An example of commercially available 2-methyl-1[4-methylthio]phenyl-2-morpholinopropan-1-one is IRGACURE 907 (manufactured by CIBA JAPAN).

Bi- or Higher Functional Monomer Component

As the bi- or higher functional monomer component, a bi- or higher functional (meth)acrylate monomer can be used. A bi- or higher functional (meth)acrylate monomer has a glass transition temperature of −40° C. to 90° C. in the form of a simple, cured substance, and has an aliphatic residue, an alicyclic residue, or an aromatic residue in the main-chain structure and/or the side-chain structure.

Examples of bi- or higher functional (meth)acrylate monomers include ethoxylated hexanediol diacrylate, caprolactone-modified neopentylglycol hydroxypivalate diacrylate, ethoxylated trimethylolpropane triacrylate, propoxylated trimethylolpropane triacrylate, and caprolactone-modified dipentaerythritol hexaacrylate. Two or more kinds of these bi- or higher functional (meth)acrylate monomers may be used in combination.

An example of commercially available caprolactone-modified neopentylglycol hydroxypivalate diacrylate is HX-620 (manufactured by NIPPON KAYAKU). Examples of commercially available ethoxylated trimethylolpropane triacrylate are CD561 and SR9035 (both manufactured by SARTOMER JAPAN). An example of commercially available propoxylated trimethylolpropane triacrylate is SR492 (manufactured by SARTOMER JAPAN). An example of commercially available caprolactone-modified dipentaerythritol hexaacrylate is DPCA-120 (manufactured by NIPPON KAYAKU).

Monofunctional Monomer Component

As a monofunctional monomer component, a monofunctional (meth)acrylate monomer can be used. The monofunctional (meth)acrylate monomer has a glass transition temperature of −50° C. to 50° C. in the form of a simple, cured substance, and has an aliphatic residue, an alicyclic residue, or an aromatic residue in the main-chain structure or the side-chain structure. Examples of monofunctional (meth)acrylate monomers include 2-phenoxyethyl acrylate and tetrahydrofurfuryl acrylate. One kind of monofunctional (meth)acrylate monomer may be used, or alternatively, two or more kinds of monofunctional (meth)acrylate monomers may used in combination.

An example of commercially available 2-phenoxyethyl acrylate is light acrylate PO-A (manufactured by KYOEI KAGAKU). An example of commercially available tetrahydrofurfuryl acrylate is SR285 (manufactured by SARTOMER JAPAN).

Based on 100 parts by mass of the total amount of UV-curable resin composition, the amount of oligomer component is 10 parts by mass to 80 parts by mass, for example. The amount of photopolymerization initiator component is 0.5 parts by mass to 10 parts by mass, for example. In the case where a bi- or higher functional monomer component and a monofunctional monomer component are used, the amounts thereof are as follows: the amount of bi- or higher functional monomer component is 20 parts by mass to 60 parts by mass, and the amount of monofunctional monomer component is 5 parts by mass to 30 parts by mass.

The thickness of the light transmission layer 6 is preferably selected from a range of 10 μm to 177 μm, and is 100 μm, for example. Such a thin light transmission layer 6 is combined, for example, with an objective lens with a high NA (numerical aperture) of about 0.85. High-density recording can thus be realized.

Method for Producing Recordable Optical Recording Medium

The following describes an example of the method for producing the above recordable optical recording medium 10.

Step of Forming Substrate

First, a substrate 1 is formed. The substrate 1 has an uneven surface 8 formed on one principal surface thereof. The substrate 1 can be formed by an injection molding method (injection), a photo polymerization method (2P method: Photo Polymerization), or the like, for example.

Step of Forming Reflective Layer

Next, the substrate 1 is transported into a vacuum chamber with a target containing a material for forming a reflective layer 2, for example. The vacuum chamber is then evacuated to a predetermined pressure. Subsequently, while introducing a process gas, such as Ar gas, into the vacuum chamber, the target is sputtered to form a reflective layer 2 on the substrate 1.

Step of Forming First Protective Layer

Next, the substrate 1 is transported into a vacuum chamber with a target containing a material for forming a first protective layer 3, for example. The vacuum chamber is then evacuated to a predetermined pressure. Subsequently, while introducing a process gas, such as Ar gas or O2 gas, into the vacuum chamber, the target is sputtered to form a first protective layer 3 on the reflective layer 2. The sputtering technique therefor may be radio-frequency (RF) sputtering or direct-current (DC) sputtering, for example. Particularly, DC sputtering is preferable. This is because DC sputtering achieves a higher rate of film formation than RF sputtering, allowing improvement of productivity.

Step of Forming Information Recording Layer

Next, the substrate 1 is transported into a vacuum chamber with a target containing a material for forming an information recording layer 4, for example. The vacuum chamber is then evacuated to a predetermined pressure. Subsequently, while introducing a process gas, such as Ar gas, into the vacuum chamber, the target is sputtered to form an information recording layer 4 on the first protective layer 3.

Step of Forming Second Protective Layer

Next, the substrate 1 is transported into a vacuum chamber with a target containing a material for forming a second protective layer 5, for example. The vacuum chamber is then evacuated to a predetermined pressure. Subsequently, while introducing a process gas, such as Ar gas or O2 gas, into the vacuum chamber, the target is sputtered to form a second protective layer 5 on the information recording layer 4. The sputtering technique therefor may be radio-frequency (RF) sputtering or direct-current (DC) sputtering, for example. Particularly, DC sputtering is preferable. This is because DC sputtering achieves a higher rate of film formation than RF sputtering, allowing improvement of productivity.

Step of Forming Light Transmission Layer

Next, a light transmission layer 6 is formed on the second protective layer 5. The light transmission layer 6 is formed, for example, by applying the above-described UV-curable resin composition onto the second protective layer 5 by spin coating, and then curing the applied UV-curable resin composition by UV irradiation.

Through these steps, the recordable optical recording medium 10 shown in FIG. 1 is obtained.

Advantages

In the optical recording medium according to the first embodiment, the storage elastic modulus of the light transmission layer 6 at −5° C. is within a range of 1500 MPa or less, and more preferably within a range of 20 MPa or more and 1500 MPa or less. As a result, warping of the recordable optical recording medium 10 at a low temperature of about −5° C., for example, can be significantly reduced.

2. Second Embodiment

Configuration of Optical Recording Medium

Figure 2:
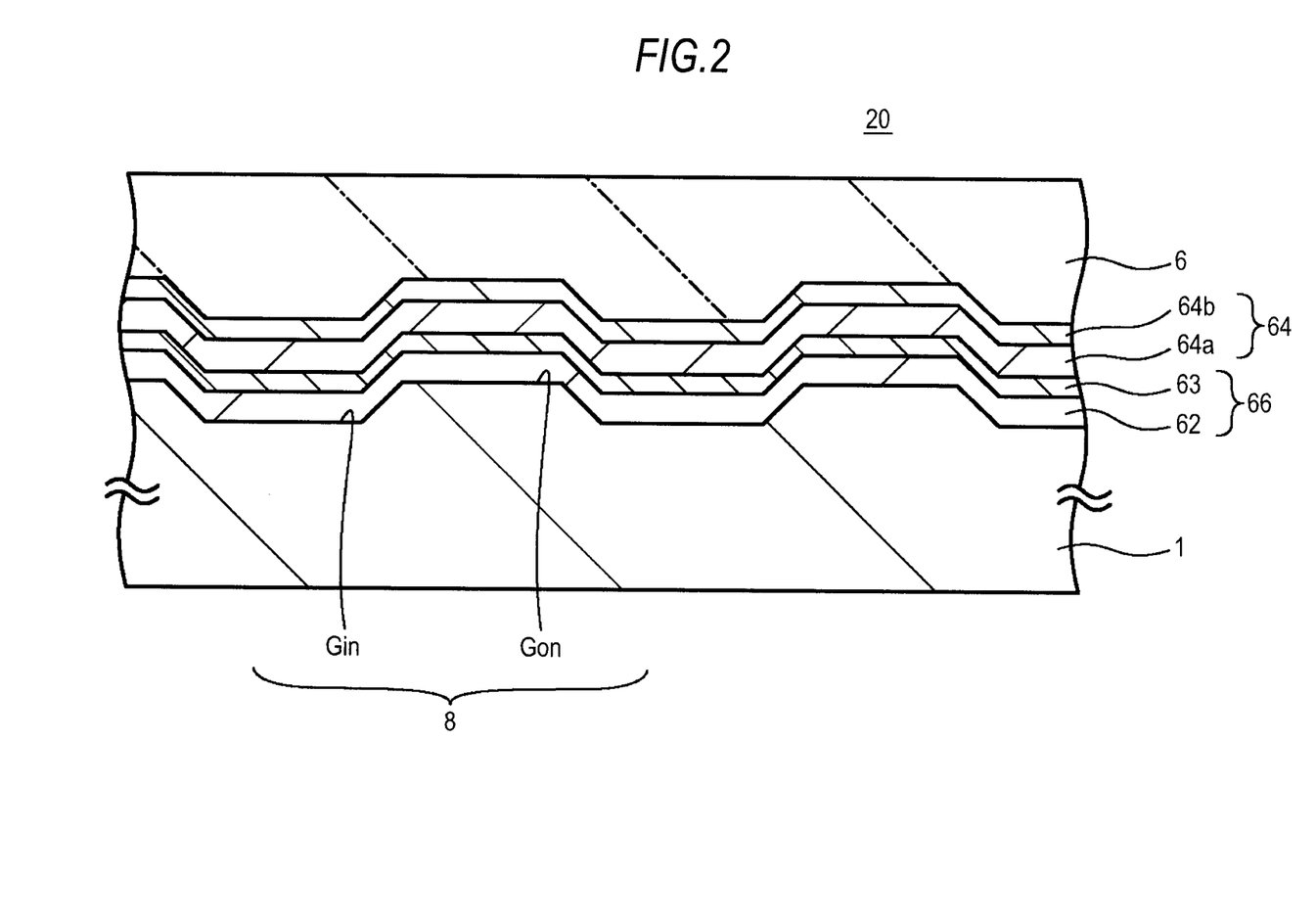
FIG. 2 is a cross section showing a configuration example of an optical recording medium according to a second embodiment.

The following will describe a recordable optical recording medium according to a second embodiment. FIG. 2 is a cross section schematically showing a configuration example of a recordable optical recording medium according to the second embodiment. The recordable optical recording medium 20 is configured to include an information recording layer 66, a dielectric layer 64, and a light transmission layer 6 sequentially stacked on a substrate 1.

In the recordable optical recording medium 20 according to the second embodiment, the information recording layer 66 is irradiated with a laser beam from the light-transmission-layer-6 side to record or reproduce an information signal. For example, a laser beam having a wavelength within a range of 400 nm or more and 410 nm or less is concentrated by an objective lens with a numerical aperture within a range of 0.84 or more and 0.86 or less, and is applied to the information recording layer 66 from the light-transmission-layer-6 side, whereby the information recording layer 66 records or reproduces an information signal. An example of such a recordable optical recording medium 20 is BD-R (Blu-ray Disc Recordable).

The following describes, in turn, each of the substrate 1, the information recording layer 66, the dielectric layer 64, and the light transmission layer 6 forming the recordable optical recording medium 20.

Substrate

The substrate 1 has the same configuration as in the first embodiment.

Information Recording Layer

The information recording layer 66 includes a metal layer 62 and an oxide layer 63 sequentially stacked on the uneven surface 8 of the substrate 1. The metal layer 62 is a layer adjacent to the oxide layer 63, and substantially made of titanium (Ti). Basically, when Ti is used as a main material, excellent recording characteristics can be obtained.

In order to improve optical properties, durability, recording sensitivity, etc., the metal layer 62 may contain an additive. For example, at least one kind of additive selected from the group consisting of aluminum (Al), silver (Ag), copper (Cu), palladium (Pd), germanium (Ge), silicon (Si), tin (Sn), nickel (Ni), iron (Fe), magnesium (Mg), vanadium (V), carbon (C), calcium (Ca), boron (B), chromium (Cr), niobium (Nb), zirconium (Zr), sulfur (S), selenium (Se), manganese (Mn), gallium (Ga), molybdenum (Mo) tungsten (W), terbium (Tb), dysprosium (Dy), gadolinium (Gd), neodymium (Nd), zinc (Zn), tantalum (Ta), and strontium (Sr) can be used.

The material for the metal layer 62 may be oxidized. An example of such an oxide is TiSiO. Oxidization improves the jitter performance.

The material for the metal layer 62 may alternatively be nitrided. An example of such a nitride is TiSi—N. Nitriding increases the power margin.

The oxide layer 63 substantially made of GeO, an oxide of germanium (Ge). The absorption coefficient k of the oxide layer 63 is preferably within a range of 0.15 or more and 0.90 or less, more preferably 0.20 or more and 0.70 or less, and still more preferably 0.25 or more and 0.60 or less. The thickness of the oxide layer 63 is preferably within a range of 10 nm or more and 35 nm or less. When the range of 0.15 or more and 0.90 or less is satisfied, an excellent degree of modulation and an excellent carrier/noise ratio (hereinafter referred to as C/N ratio) can be obtained, for example. When the range of 0.20 or more and 0.70 or less is satisfied, an even more excellent degree of modulation and an even more excellent C/N ratio can be obtained, for example. When the range of 0.25 or more and 0.60 or less is satisfied, a still more excellent degree of modulation and a still more excellent C/N ratio can be obtained, for example.

The absorption coefficient herein is an absorption coefficient at a wavelength of 410 nm. The measured value thereof is a value measured using an ellipsometer (manufactured by RUDOLF, trade name: Auto EL-462P17).

Further, the oxide layer 63 may contain an additive. As such an additive, for example, at least one kind of additive selected from the group consisting of tellurium (Te), chromium (Cr), palladium (Pd), lead (Pt), copper (Cu), zinc (Zn), gold (Au), silver (Ag), silicon (Si), titanium (Ti), iron (Fe), nickel (Ni), tin (Sn), and antimony (Sb) can be used. Addition of such an additive can improve durability and/or reactivity (recording sensitivity). For improving durability, Pd, Pt, Si, Sb, and Cr are particularly preferable.

Dielectric Layer

The dielectric layer 64 includes a first dielectric layer 64a and a second dielectric layer 64b sequentially stacked on the information recording layer 66. The first dielectric layer 64a and the second dielectric layer 64b serve to optically and mechanically protect the information recording layer 66. That is, they improve the durability and suppress the deformation, such as swelling, of the information recording layer 66 during recording.

The first dielectric layer 64a is made of $ZnS-SiO_2$, for example. The thickness of the first dielectric layer 64a is preferably within a range of 10 nm or more and 58 nm or less, and more preferably 23 nm or more and 53 nm or less. A thickness of 10 nm or more leads to excellent jitter performance, while a thickness of 58 nm or less results in excellent reflectance.

The second dielectric layer 64b is made of $ZrO_2$ and $Cr_2O_3$, for example. The $Cr_2O_3$ content is preferably within a range of 40 at % or more and 90 at % or less. This is because when the content is less than 40 at %, this results in a reduction in durability, while when the content is more than 90 at %, this results in a reduction in durability and also leads to degradation of the initial recording characteristics. It is preferable that the second dielectric layer 64b further contains $SiO_2$. When the second dielectric layer 64b contains $SiO_2$, this makes it possible to adjust the recording characteristics including recording sensitivity, power margin, light strategy, etc. The thickness of the second dielectric layer 64b is preferably within a range of 2 nm or more and 20 nm or less. A thickness of less than 2 nm provides the second dielectric layer 64b with reduced uniformity, while a thickness of more than 20 nm requires a longer time for forming the layer, resulting in a reduction in productivity.

Light Transmission Layer

The light transmission layer 6 has the same configuration as in the first embodiment.

Method for Producing Recordable Optical Recording Medium

The following describes an example of the method for producing the recordable optical recording medium 20 having the above configuration.

First, a substrate 1 is formed by an injection molding method (injection), a photo polymerization method (2P method: Photo Polymerization), or the like, for example. Next, for example, a metal layer 62, an oxide layer 63, a first dielectric layer 64a, and a second dielectric layer 64b are stacked in this order on the substrate 11. These thin films can be formed, for example, by a vacuum film-forming technology, such as sputtering, vacuum deposition, or the like.

Next, a light transmission layer 6 is formed on the second dielectric layer 64b. The light transmission layer 6 is formed, for example, by applying the above-described UV-curable resin composition onto the second dielectric layer 64b by spin coating, and then curing the composition by UV irradiation.

Through these steps, the recordable optical recording medium 20 shown in FIG. 2 is obtained.

Advantages

The optical recording medium according to the second embodiment provides the same advantages as the first embodiment.

3. Third Embodiment

Configuration of Optical Recording Medium

Figure 3:
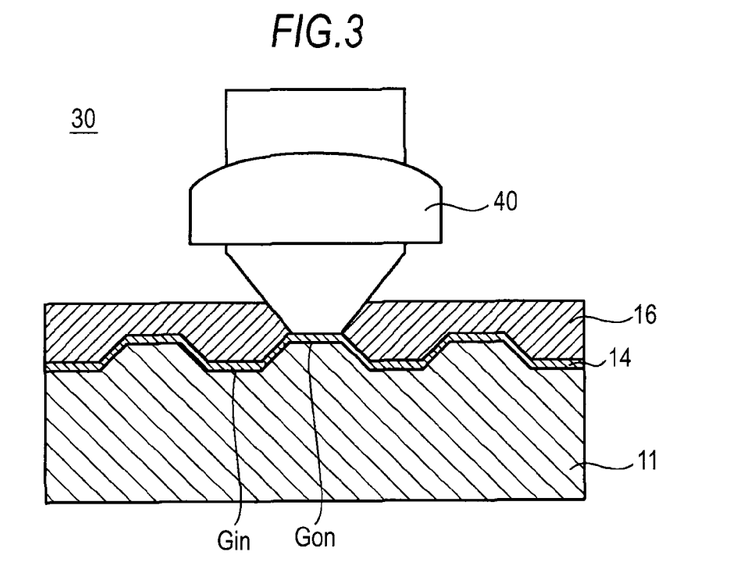
FIG. 3 is a cross section showing a configuration example of an optical recording medium according to a third embodiment.

FIG. 3 shows a configuration example of an optical recording medium according to a third embodiment. The optical recording medium is a rewritable optical recording medium 30 whose data can be erased and rewritten. As shown in FIG. 3, the optical recording medium 30 is configured to include an information recording layer 14 and a light transmission layer 16 stacked in this order on a substrate 11.

In the optical recording medium 30, the information recording layer 14 is irradiated with a laser beam from the light-transmission-layer-16 side to record or reproduce an information signal. For example, a laser beam having a wavelength of 400 nm to 410 nm is concentrated by an objective lens 40 with a numerical aperture of 0.84 to 0.86, and is applied to the information recording layer 14 from the light-transmission-layer-16 side, whereby the information recording layer 14 records or reproduces an information signal. An example of such an optical recording medium 30 is BD-RE (Blu-ray Disc Recordable).

The following describes, in turn, the substrate 11, the information recording layer 14, and the light transmission layer 16 forming the optical recording medium 30.

Substrate

The substrate 11 is the same as the substrate 1 of the first embodiment.

Information Recording Layer

Figure 4:
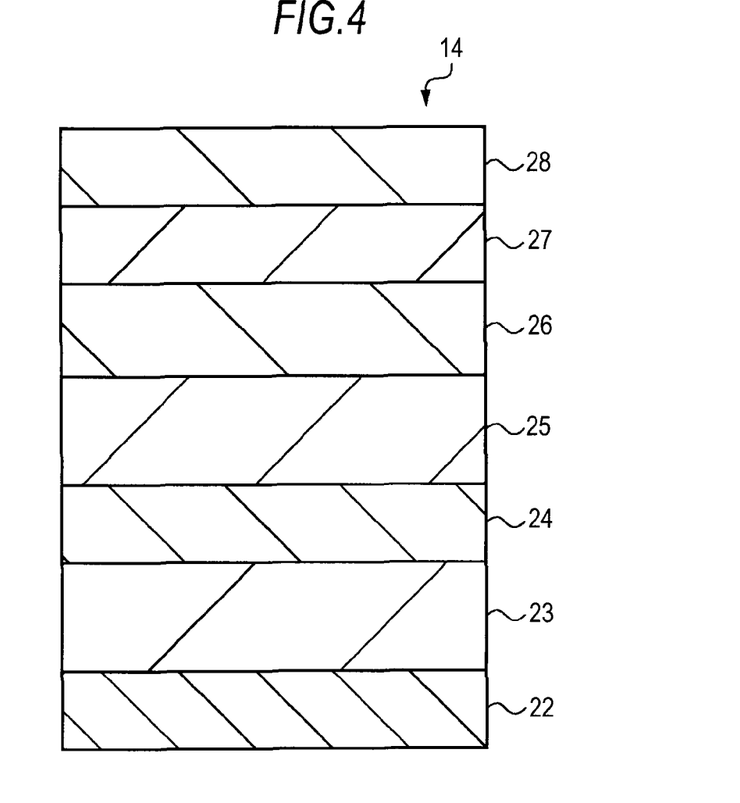
FIG. 4 is a cross section showing a configuration example of an information recording layer of the optical recording medium according to the third embodiment.

FIG. 4 shows a configuration example of the information recording layer 14. As shown in FIG. 4, the information recording layer 14 is a film with a stacked layer structure including, for example, a reflective layer 22, a second dielectric layer 23, a first dielectric layer 24, a recording layer 25, a first dielectric layer 26, a second dielectric layer 27, and a third dielectric layer 28 stacked in this order on the substrate 11.

Reflective Layer

The reflective layer 22 is a layer for reflecting the incident laser beam to improve the optical properties and quickly dissipating heat absorbed by the recording layer 25. The material for the reflective layer 22 may be a simple substance such as Al, Ag, Au, Ni, Cr, Ti, Pd, Co, Si, Ta, W, Mo, or Ge, or may also be a material containing an alloy thereof as a main component, for example. Among these, Al-based materials, Ag-based materials, Au-based materials, Si-based materials, and Ge-based materials are particularly preferable in terms of practical use. Preferred examples of alloys include Al—Ti, Al—Cr, Al—Cu, Al—Mg—Si, Ag—Pd—Cu, Ag—Pd—Ti, and Si—B. The material is preferably selected from these in consideration of optical properties and thermal properties. For example, an Al-based or Ag-based material is preferable in consideration of the fact that they have high reflectance even in the short-wavelength range.

The first dielectric layer 24, the second dielectric layer 23, the first dielectric layer 26, the second dielectric layer 27, and the third dielectric layer 28 are layers for protecting the recording layer 25 and controlling the optical properties, thermal stability, etc. The dielectric material for such a dielectric layer may be an oxide of Si, In, Zr, Cr, Sn, Ta, Al, Nb, or the like, a nitride of Si, Al, or the like, a sulfide of Zn or the like, or a mixture of two or more kinds of these dielectric materials, for example. Specific examples thereof include SiN, ZnS—SiO$_2$, AlN, Al$_2$O$_3$, SiO$_2$, Cr$_2$O$_3$, In$_2$O$_3$, ZrO$_2$, SCZ, SIZ, TiO$_2$, Nb$_2$O$_5$, etc. The first dielectric layer 24 and the first dielectric layer 26 may be made of different materials. Alternatively, the second dielectric layer 23 and the second dielectric layer 27 may be made of different materials.

The thermal conductivity of the second dielectric layer 23 adjacent to the reflective layer 22 is preferably higher than the thermal conductivity of the first dielectric layer 24 adjacent to the recording layer 25. As a result, heat of the recording layer 25 heated by laser beam irradiation can be rapidly dissipated to an Ag alloy, and the second information recording layer 4 can thus be provided with improved durability against repetitive recording. In the case where the first dielectric layer 24 and the second dielectric layer 23 contain SiO$_2$, In$_2$O$_3$, and ZrO$_2$ as main components, it is preferable that the proportion of In$_2$O$_3$ in each dielectric layer satisfies the following relation. That is, defining the proportion of In$_2$O$_3$ in the first dielectric layer 24 adjacent to the recording layer 25 as "a" (mol %), and the proportion of In$_2$O$_3$ in the second dielectric layer 23 adjacent to the reflective layer 22 as "b" (mol %), it is preferable that the relation a<b is satisfied. By satisfying such a relation, the thermal conductivity of the second dielectric layer 23 can be higher than the thermal conductivity of the first dielectric layer 24. The proportion herein is based on the total amount of SiO$_2$, In$_2$O$_3$, and ZrO$_2$ in the first dielectric layer 24 or the second dielectric layer 23 taken as 100 mol %. The thermal conductivity herein is the thermal conductivity in the thickness direction of each thin film.

Specifically, when the first dielectric layer 24 and the second dielectric layer 23 contain SiO$_2$, In$_2$O$_3$, and ZrO$_2$ as main components, it is preferable that the first dielectric layer 24 has a composition represented by the following formula (1):

$(SiO_2)_{x1}(In2O3)y1(ZrO2)z1$     (1)

wherein x1+y1+z1=100, 5≤x1≤20, 40≤y1≤60, and 30≤z1≤50, and the second dielectric layer 23 has a composition represented by the following formula (2):

$(SiO_2)_{x1}(In_2O_3)y2(ZrO2)z2$     (2)

wherein x2+y2+z2=100, 5≤2≤20, 60≤y2≤90, and 5≤z2≤20.

The information recording layer 25 is a recording layer capable of repeatedly recording an information signal by irradiation with a laser beam, for example. Specifically, the recording layer 25 is, for example, a phase-change recording layer which undergoes a reversible phase change between an amorphous phase and a crystal phase by irradiation with a laser beam, whereby an information signal is recorded and rewritten. The material for the phase-change recording layer may be a eutectic phase-change material or a compound phase-change material, for example. Specific examples of phase-change materials include those containing GeSbTe, SbTe, BiGeTe, BiGeSbTe, AgInSbTe, GeSnSbTe, etc as a main component. If necessary, to such a phase-change material containing them as a main component may be added one or more kinds of metal materials such as Ag, In, Cr, and Mn.

A preferred example of a BiGeTe-based material, a compound phase-change material, is one having a composition represented by the following formula (3).

$Bi_xGe_yTe_z$     (3)

wherein x+y+z=100, 2≤x≤10, 35≤y≤45, and 45≤z≤55.

In the information recording layer 14, the thermal conductivity of the second dielectric layer 23 adjacent to the reflective layer 22 is higher than the thermal conductivity of the first dielectric layer 24 adjacent to the recording layer 25. As a result, heat of the recording layer 25 heated by laser beam irradiation can be rapidly dissipated to the reflective layer 22, and the information recording layer 14 can thus be provided with improved durability against repetitive recording. That is, in a rewritable optical recording medium, the durability against repetitive recording can be improved.

Further, even when the reflective layer 22 has a reduced thickness to control the transmittance of the laser beam through the information recording layer 14, heat of the recording layer 25 heated by laser beam irradiation can be rapidly dissipated to the reflective layer 22. Therefore, in such a rewritable optical recording medium, the durability against repetitive recording can be improved.

Further, in the case where the first dielectric layer 24 and the second dielectric layer 23 each contains SiO$_2$, In$_2$O$_3$, and ZrO$_2$ as main components, by controlling the proportion of In$_2$O$_3$ in each of these two dielectric layers, the thermal conductivity of each dielectric layer can be easily controlled. Specifically, the proportions in the dielectric layers are preferably set so that defining the proportion of In$_2$O$_3$ in the first dielectric layer 24 adjacent to the recording layer 25 as "a" (mol %), and the proportion of In$_2$O$_3$ in the second dielectric layer 23 adjacent to the reflective layer 22 as "b" (mol %), the relation a<b is satisfied. This is because as a result of this configuration, the thermal conductivity of the second dielectric layer 23 adjacent to the reflective layer 22 can be higher than the thermal conductivity of the first dielectric layer 24 adjacent to the recording layer 25.

It is also preferable that the first dielectric layer 24 and the second dielectric layer 23 each contains SiO$_2$, In$_2$O$_3$, and ZrO$_2$ as main components, and that the recording layer 25 contains Bi, Ge, and Te as main components. This suppresses the formation of crystals in the recording layer 25, providing more excellent signal properties.

Light Transmission Layer

The light transmission layer 16 has the same configuration as the light transmission layer 6 of the recordable optical recording medium 10 according to the first embodiment.

Method for Producing Optical Recording Medium

The following describes an example of the method for producing the recording medium 30 having the above configuration.

First, a substrate 11 is formed by an injection molding method (injection), a photo polymerization method (2P method: Photo Polymerization), or the like, for example. Next, a reflective layer 22, a second dielectric layer 23, a first dielectric layer 24, a recording layer 25, a first dielectric layer 26, a second dielectric layer 27, and a third dielectric layer 28 are stacked in this order on the substrate 11, for example. This forms an information recording layer 14 on the substrate 11. These thin films can be formed, for example, by a vacuum film-forming technology, such as sputtering, vacuum deposition, or the like.

Next, a light transmission layer 16 is formed on the information recording layer 14. The light transmission layer 16 is formed, for example, by applying the above-described UV-curable resin composition onto the information recording layer 14 by spin coating, and then curing the applied UV-curable resin composition by UV irradiation.

Through these steps, the optical recording medium 20 shown in FIG. 3 is obtained.

Advantages

In the optical recording medium 30 according to the third embodiment, the storage elastic modulus of the light transmission layer 16 at −5° C. is within a range of 1500 MPa or less, and more preferably within a range of 20 MPa or more and 1500 MPa or less. As a result, warping of the rewritable optical recording medium 30 at a low temperature of about −5° C., for example, can be significantly reduced.

4. Fourth Embodiment

Figure 5:
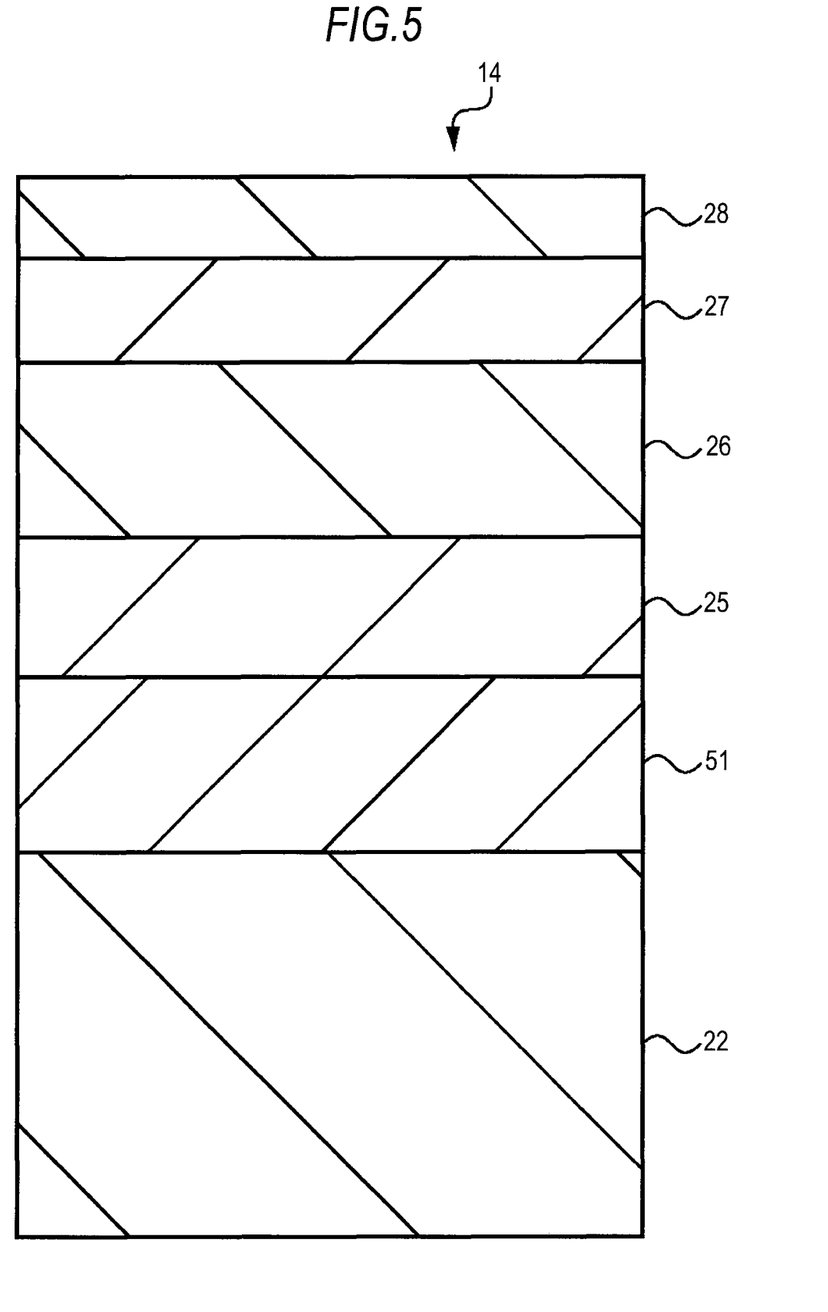
FIG. 5 is a cross section showing a configuration example of an information recording layer of an optical recording medium according to a fourth embodiment.

The following will describe an optical recording medium according to a fourth embodiment. FIG. 5 shows a configuration example of an information recording layer of the optical recording medium according to the fourth embodiment. The same components as in the third embodiment are indicated with the same reference numerals, and will not be further described.

The optical recording medium according to the fourth embodiment is the same as the optical recording medium according to the third embodiment, except for the configuration of the information recording layer 14. Therefore, the following describes the configuration of the information recording layer 14 in detail. Because other components are the same as those of the optical recording medium according to the third embodiment, they will not be described in detail.

Information Recording Layer

As shown in FIG. 5, in the optical recording medium of the fourth embodiment, the information recording layer 14 has a single dielectric layer 51 between a reflective layer 22 and a recording layer 25. The optical recording medium of the fourth embodiment differs from that of the third embodiment in this respect.

The dielectric layer 51 contains $SiO_2$, $In_2O_3$, and $ZrO_2$ as main components. The proportion of $In_2O_3$ in the dielectric layer 51 is preferably 40 mol % or more and 60 mol % or less. The proportion herein is based on the total amount of $SiO_2$, $In_2O_3$, and $ZrO_2$ in the dielectric layer 51 taken as 100 mol %. More specifically, it is preferable that the dielectric layer 51 has a composition represented by the following formula (4).

$$(SiO_2)_{x1}(In_2O_3)_{y1}(ZrO_2)_{z1} \tag{4}$$

wherein $x1+y1+z1=100$, $5 \leq x1 \leq 20$, $40 \leq y1 \leq 60$, and $30 \leq z1 \leq 50$.

Advantages

The optical recording medium according to the fourth embodiment provides the same advantages as the third embodiment.

EXAMPLES

Sample 1

Figure 6:
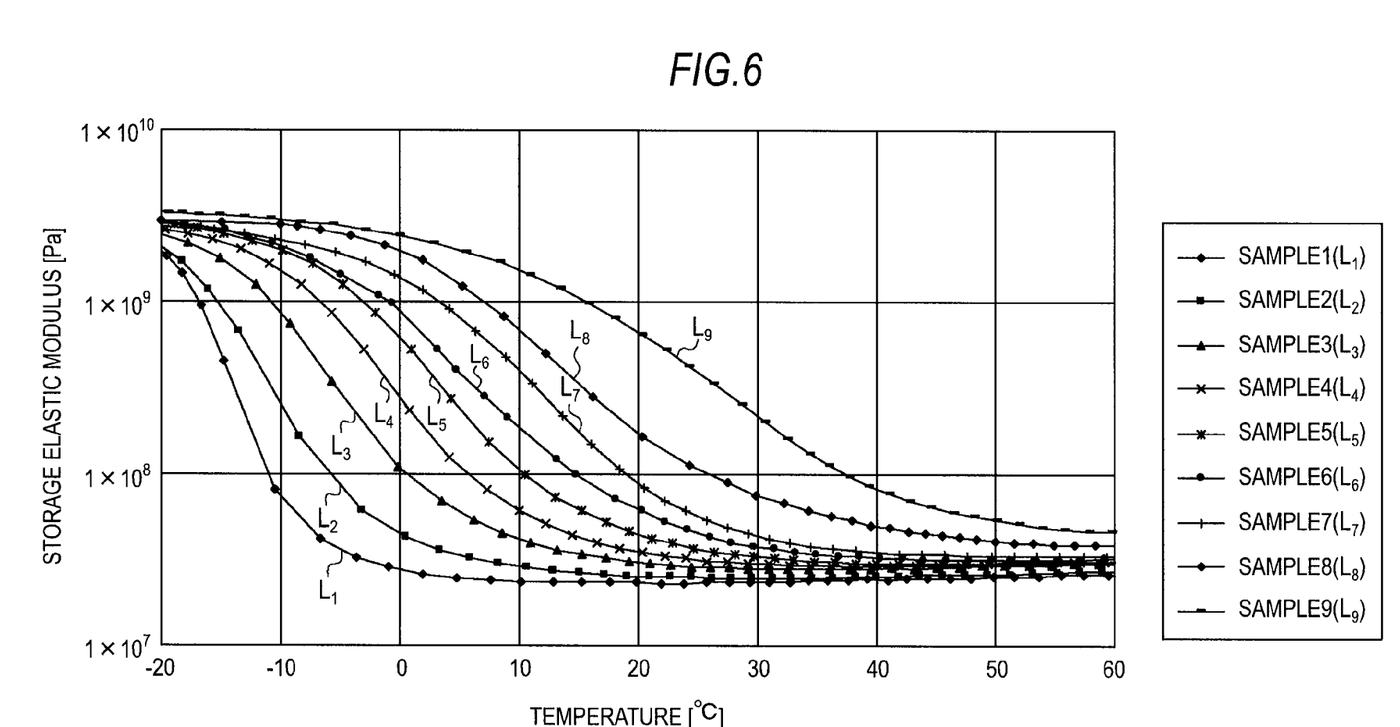
FIG. 6 is a graph showing the results of the measurement of the storage elastic modulus of Samples 1 to 7.

Appropriately adjusted amounts of the following components were used to prepare a UV-curable resin composition of Sample 1 having the storage elastic modulus indicated by the line L1 in FIG. 6.

Oligomer Component

Urethane (meth)acrylate (manufactured by NIPPON GOHSEI, trade name: UV6100B)

Photopolymerization Initiator Component (manufactured by CIBA JAPAN, trade name: IRGACURE 184)

Bi- or Higher Functional Monomer Component

Propoxylated trimethylolpropane triacrylate (manufactured by SARTOMER JAPAN, trade name: SR9035)

Caprolactone-modified dipentaerythritol hexaacrylate (manufactured by NIPPON KAYAKU, trade name: DPCA-120)

The storage elastic modulus shown in FIG. 6 was measured as follows (this applies also to Samples 2 to 7 below). First, the UV-curable resin composition was applied between PET films to achieve a thickness of 100 µm as cured, and then cured using a metal halide lamp (manufactured by USHIO, UVL-4000M3-N1, lamp output: 120 W/cm) at 500 mJ/cm². The storage elastic modulus of the cured film in an environment with temperatures of −20° C. to 120° C. was measured using a viscoelasticity spectrometer (manufactured by SEIKO INSTRUMENTS, DMS6100).

Sample 2

The kinds of materials used in Sample 1 as the oligomer component, the photopolymerization initiator component, and the bi- or higher functional monomer components, as well as the amounts thereof, were suitably changed. Using such components and optionally a monofunctional monomer component as mentioned above, a UV-curable resin composition of Sample 2 having the storage elastic modulus indicated by the line L2 in FIG. 6 was prepared.

Sample 3

The kinds of materials used in Sample 1 as the oligomer component, the photopolymerization initiator component, and the bi- or higher functional monomer components, as well as the amounts thereof, were suitably changed. Using such components and optionally a monofunctional monomer component as mentioned above, a UV-curable resin composition of Sample 3 having the storage elastic modulus indicated by the line L3 in FIG. 6 was prepared.

Sample 4

The kinds of materials used in Sample 1 as the oligomer component, the photopolymerization initiator component, and the bi- or higher functional monomer components, as well as the amounts thereof, were suitably changed. Using such components and optionally a monofunctional monomer component as mentioned above, a UV-curable resin composition of Sample 4 having the storage elastic modulus indicated by the line L4 in FIG. 6 was prepared.

Sample 5

The kinds of materials used in Sample 1 as the oligomer component, the photopolymerization initiator component, and the bi- or higher functional monomer components, as well as the amounts thereof, were suitably changed. Using such components and optionally a monofunctional monomer component as mentioned above, a UV-curable resin composition of Sample 5 having the storage elastic modulus indicated by the line L5 in FIG. 6 was prepared.

Sample 6

The kinds of materials used in Sample 1 as the oligomer component, the photopolymerization initiator component, and the bi- or higher functional monomer components, as well as the amounts thereof, were suitably changed. Using such components and optionally a monofunctional monomer component as mentioned above, a UV-curable resin composition of Sample 6 having the storage elastic modulus indicated by the line L6 in FIG. 6 was prepared.

Sample 7

The kinds of materials used in Sample 1 as the oligomer component, the photopolymerization initiator component, and the bi- or higher functional monomer components, as well as the amounts thereof, were suitably changed. Using such components and optionally a monofunctional monomer component as mentioned above, a UV-curable resin composition of Sample 7 having the storage elastic modulus indicated by the line $L_7$ in FIG. 6 was prepared.

Sample 8

The kinds of materials used in Sample 1 as the oligomer component, the photopolymerization initiator component, and the bi- or higher functional monomer components, as well as the amounts thereof, were suitably changed. Using such components and optionally a monofunctional monomer component as mentioned above, a UV-curable resin composition of Sample 8 having the storage elastic modulus indicated by the line $L_8$ in FIG. 6 was prepared.

Sample 9

The kinds of materials used in Sample 1 as the oligomer component, the photopolymerization initiator component, and the bi- or higher functional monomer components, as well as the amounts thereof, were suitably changed. Using such components and optionally a monofunctional monomer component as mentioned above, a UV-curable resin composition of Sample 9 having the storage elastic modulus indicated by the line $L_9$ in FIG. 6 was prepared.

The following measurement was performed on the UV-curable resin compositions of Samples 1 to 9.

Measurement of Warping of Optical Disc

Evaluation optical discs were prepared as follows using the UV-curable compositions of Samples 1 to 9 to form respective light transmission layers.

First, a substrate having in-grooves and on-grooves in one principal surface thereof was formed by injection molding. The substrate is a BD substrate having a thickness of 1.1 mm, a track pitch of 0.32 and a groove depth of 20 nm.

Next, films structured as follows were sequentially formed on the substrate by sputtering.

The following shows the material and thickness of each film.

Metal Film
Material: AgNdCu, Thickness: 123 nm
First Dielectric Film
Material: $Si_3N_4$, Thickness: 8 nm
Second Dielectric Film
Material: $(ZnS)_{80}$—$(SiO_2)_{20}$, Thickness: 7 nm
Phase-Change Recording Film
Material: $Ge_{6.5}Sb_{77.1}Te_{16.4}$, Thickness: 10 nm
Third Dielectric Film
Material: $(ZnS)_{80}$—$(SiO_2)_{20}$, Thickness: 8 nm
Fourth Dielectric Film
Material: $Si_3N_4$, Thickness: 50 nm
Fifth Dielectric Film
Material: $(SiO_2)_{20}(Cr_2O_3)_{30}(ZrO_2)_{50}$, Thickness: 5 nm Next, a UV-curable resin composition was applied by spin coating onto the substrate provided with the above films. The applied UV-curable resin composition was then cured by UV irradiation to give a 0.1-mm-thick light transmission layer. The light transmission layer is based on the BD standards, and its light-transmission-layer side serves as a recording/reproduction light incidence plane. Evaluation optical discs were thus produced.

Figure 7:
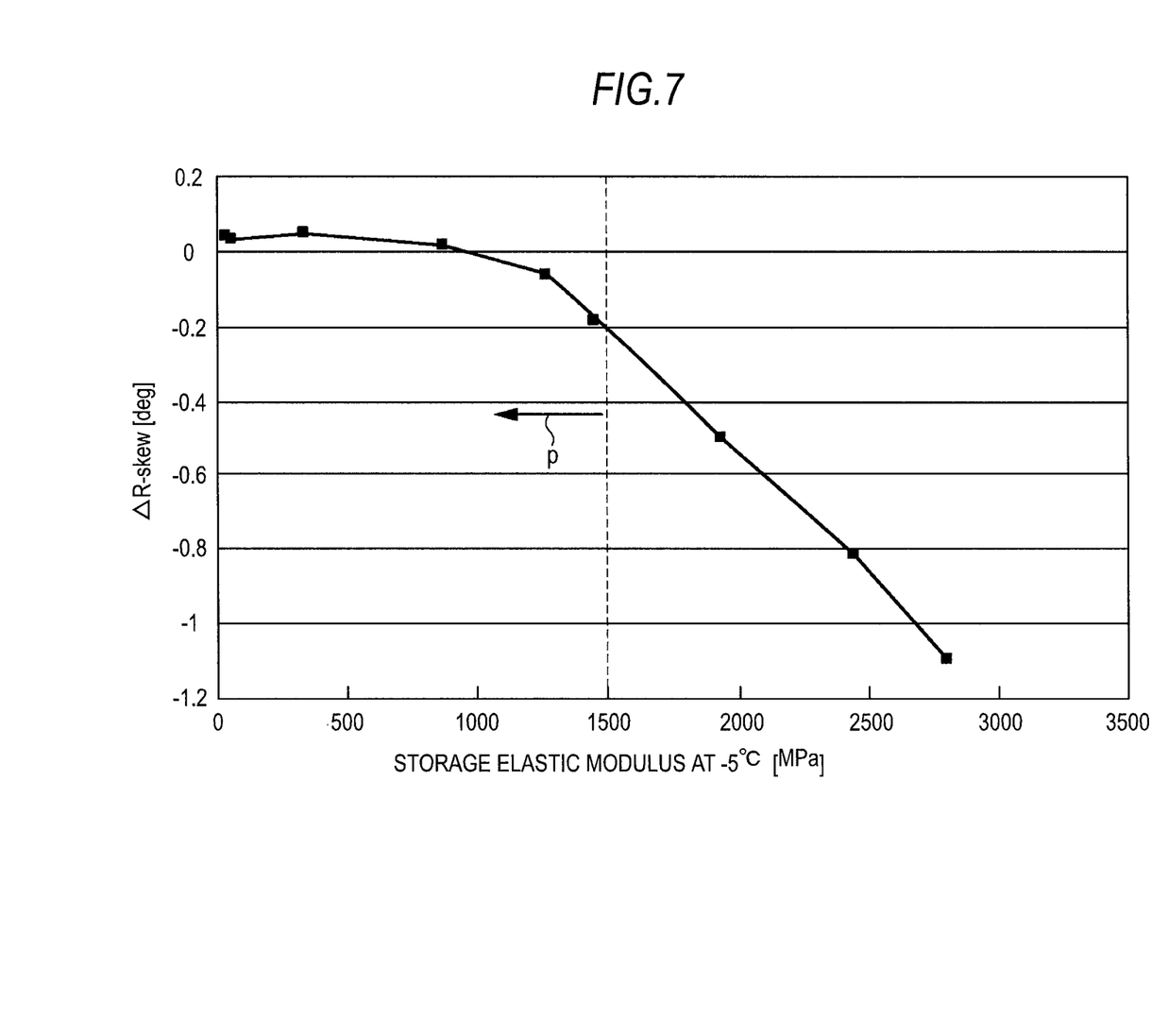
FIG. 7 is a graph plotting ΔR-skew versus storage elastic modulus at −5° C.

Each of the evaluation optical discs was allowed to stand in an environment with a temperature of −5° C. for at least 24 hours. The difference between the angle of warp of the optical disc (angle β) prior to standing (in an environment with a temperature of 25° C.) and the angle of warp of the optical disc (angle β) after standing was measured. As the difference in the angle of warp of the optical disc, the difference ΔR-skew [deg] between the angle R-skew [deg] of warp of the optical disc in the radial direction prior to standing and the angle R-skew [deg] of warp of the optical disc in the radial direction after standing was measured. The measurement results are shown in FIG. 7. The graph shown in FIG. 7 plots the storage elastic modulus at −5° C. on the abscissa and the Δ R-skew on the ordinate.

Evaluation

As shown in FIG. 7, it was confirmed that when the storage elastic modulus at −5° C. is 1500 MPa or less, the ΔR-skew is kept below −0.2 [deg]. It was also confirmed that when the storage elastic modulus at −5° C. is more than 1500 MPa, the ΔR-skew exceeds −0.2 [deg]. This indicates that warping of an optical disc at low temperatures can be remarkably reduced when the storage elastic modulus of the light transmission layer at −5° C. is within a range of 1500 MPa or less, which is shown by the arrow p. The reason for using the ΔR-skew of −0.2 [deg] as the criterion is based on the fact that considering the signal properties, reliability, and the like of a BD (Blu-ray Disc), it is desired that R-skew be −0.35 to +0.35 deg. That is, the time-dependent change in skew, Sudden change (change in skew due to a sudden change in temperature), the skew margin for environmental changes, and the skew margin of the production should be within the 0.7 deg range from −0.35 to +0.35 deg. Considering the distribution of the time-dependent change in skew, Sudden change, the skew margin for environmental changes, and the skew margin of the production, it is necessary that the skew margin for environmental changes (that is, a change in skew in an environment with a temperature of −5° C.) be at most 0.2 deg.

The application is not limited to the above embodiments, and various modifications and applications can be made without departing from the gist of the application. For example, a hard coating layer as a protective layer can be formed on the light transmission layer. In addition, for example, a printing surface labeled to indicate the content of the optical disc may be formed on the opposite side from the laser-beam incident side (so-called label surface).

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:
1. An optical recording medium comprising:
a substrate;
an information recording layer formed on the substrate for recording and reproducing an information signal by irradiation with light; and
a light transmission layer formed on the information recording layer and transmitting the light, the storage elastic modulus of the light transmission layer at −5° C. being within a range of 1500 MPa or less.

2. An optical recording medium according to claim 1, wherein the storage elastic modulus of the light transmission layer at −5° C. is within a range of 20 MPa or more and 1500 MPa or less.

3. An optical recording medium according to claim 1, wherein the substrate is made of a polycarbonate-based resin as a main component.

4. An optical recording medium according to claim 1, wherein the light transmission layer is made of a UV-curable resin composition as a main component.

5. An optical recording medium according to claim 4, wherein the UV-curable resin composition includes:

an oligomer component having a viscosity at 25° C. of 300 mPa·s or more and 3000 mPa·s or less in the form of an uncured liquid and also having a glass transition temperature of −50° C. or more and 15° C. or less in the form of a simple, cured substance; and a photopolymerization initiator component.

6. An optical recording medium according to claim 5, wherein the UV-curable resin composition further includes at least one kind of component selected from the group consisting of bi- or higher functional monomer components and monofunctional monomer components.

7. An optical recording medium according to claim 1, wherein the information recording layer is a recording layer capable of repeatedly recording an information signal by irradiation with light.

8. A method for producing an optical recording medium, comprising the steps of:

forming an information recording layer on a substrate for recording and reproducing an information signal by irradiation with light; and applying a UV-curable resin composition onto the information recording layer and then curing the UV-curable resin composition to form a light transmission layer on the information recording layer, the storage elastic modulus of the light transmission layer at −5° C. being within a range of 1500 MPa or less.

* * * * *